(12) United States Patent
Huang

(10) Patent No.: US 9,365,113 B2
(45) Date of Patent: Jun. 14, 2016

(54) CRUISE CONTROL SYSTEM FOR MOTOR VEHICLES

(75) Inventor: Pei-Shih Huang, Reichertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1635 days.

(21) Appl. No.: 12/615,578

(22) Filed: Nov. 10, 2009

(65) Prior Publication Data

US 2010/0056337 A1   Mar. 4, 2010

Related U.S. Application Data

(63) Continuation of application No. PCT/EP2008/004973, filed on Jun. 20, 2008.

(30) Foreign Application Priority Data

Jul. 6, 2007 (DE) .......................... 10 2007 031 541

(51) Int. Cl.
*B60K 31/00* (2006.01)

(52) U.S. Cl.
CPC ............ *B60K 31/00* (2013.01); *B60W 2540/10* (2013.01); *B60W 2540/12* (2013.01); *Y10T 477/83* (2015.01)

(58) Field of Classification Search
USPC ...................................... 701/93, 96; 180/170
See application file for complete search history.

(56) References Cited

U.S. PATENT DOCUMENTS

| 4,541,052 A * | 9/1985 | McCulloch ................... 701/110 |
| 5,921,641 A * | 7/1999 | Lupges et al. ................. 303/191 |
| RE36,470 E * | 12/1999 | Woll et al. ........................ 342/71 |
| 6,078,860 A * | 6/2000 | Kerns .............................. 701/93 |
| 6,293,361 B1 * | 9/2001 | Mueller ........................ 180/272 |
| 6,474,753 B1 * | 11/2002 | Rieth et al. ..................... 303/191 |
| 6,546,327 B2 * | 4/2003 | Hattori et al. .................... 701/96 |
| 6,675,923 B1 * | 1/2004 | Artis et al. ..................... 180/170 |
| 6,833,791 B2 * | 12/2004 | Bullinger et al. ............. 340/576 |
| 7,000,722 B2 * | 2/2006 | Artis et al. ..................... 180/170 |
| 7,096,109 B2 * | 8/2006 | Tanimichi et al. .............. 701/96 |

(Continued)

FOREIGN PATENT DOCUMENTS

| DE | 28 29 894 A1 | 1/1980 |
| DE | 199 61 720 C2 | 8/2001 |

(Continued)

OTHER PUBLICATIONS

International Search Report dated Oct. 15, 2008 with English translation (six (6) pages).

(Continued)

*Primary Examiner* — Thomas G Black
*Assistant Examiner* — Peter D Nolan
(74) *Attorney, Agent, or Firm* — Crowell & Moring LLP

(57) ABSTRACT

A cruise control system for motor vehicles controls the vehicle speed to a preset desired speed. The cruise control system includes an operating unit for switching the cruise control on and off, an accelerator pedal, normally present in the vehicle, for activating the cruise control and for presetting the desired speed, and a brake pedal, also normally present in the vehicle, for interrupting the active cruise control. The operating unit is configured as a single operating element, during whose actuation the cruise control is switched on or off as a function of the actual operating condition of the cruise control system.

20 Claims, 1 Drawing Sheet

(56) References Cited

U.S. PATENT DOCUMENTS

| | | | |
|---|---|---|---|
| 2003/0067215 A1* | 4/2003 | Rieth et al. | 303/20 |
| 2003/0233187 A1* | 12/2003 | Egami | 701/96 |
| 2004/0093145 A1* | 5/2004 | Tanimichi et al. | 701/93 |
| 2004/0251636 A1 | 12/2004 | Jordan | |
| 2005/0167175 A1* | 8/2005 | Isaji et al. | 180/170 |
| 2005/0173172 A1* | 8/2005 | Artis et al. | 180/178 |
| 2007/0067087 A1* | 3/2007 | Ohshima | 701/93 |

FOREIGN PATENT DOCUMENTS

| | | |
|---|---|---|
| DE | 101 60 278 A1 | 12/2002 |
| DE | 101 45 915 A1 | 4/2003 |
| DE | 101 45 914 A1 | 5/2003 |
| DE | 102 61 624 A1 | 7/2004 |
| DE | 10 2006 012 514 A1 | 9/2007 |
| EP | 1 031 453 A1 | 8/2000 |
| EP | 1 459 930 A2 | 9/2004 |
| FR | 2 849 411 A1 | 7/2004 |
| FR | 2 879 527 A1 | 6/2006 |

OTHER PUBLICATIONS

German Search Report dated Jun. 12, 2008 with English translation (nine (9) pages).

* cited by examiner

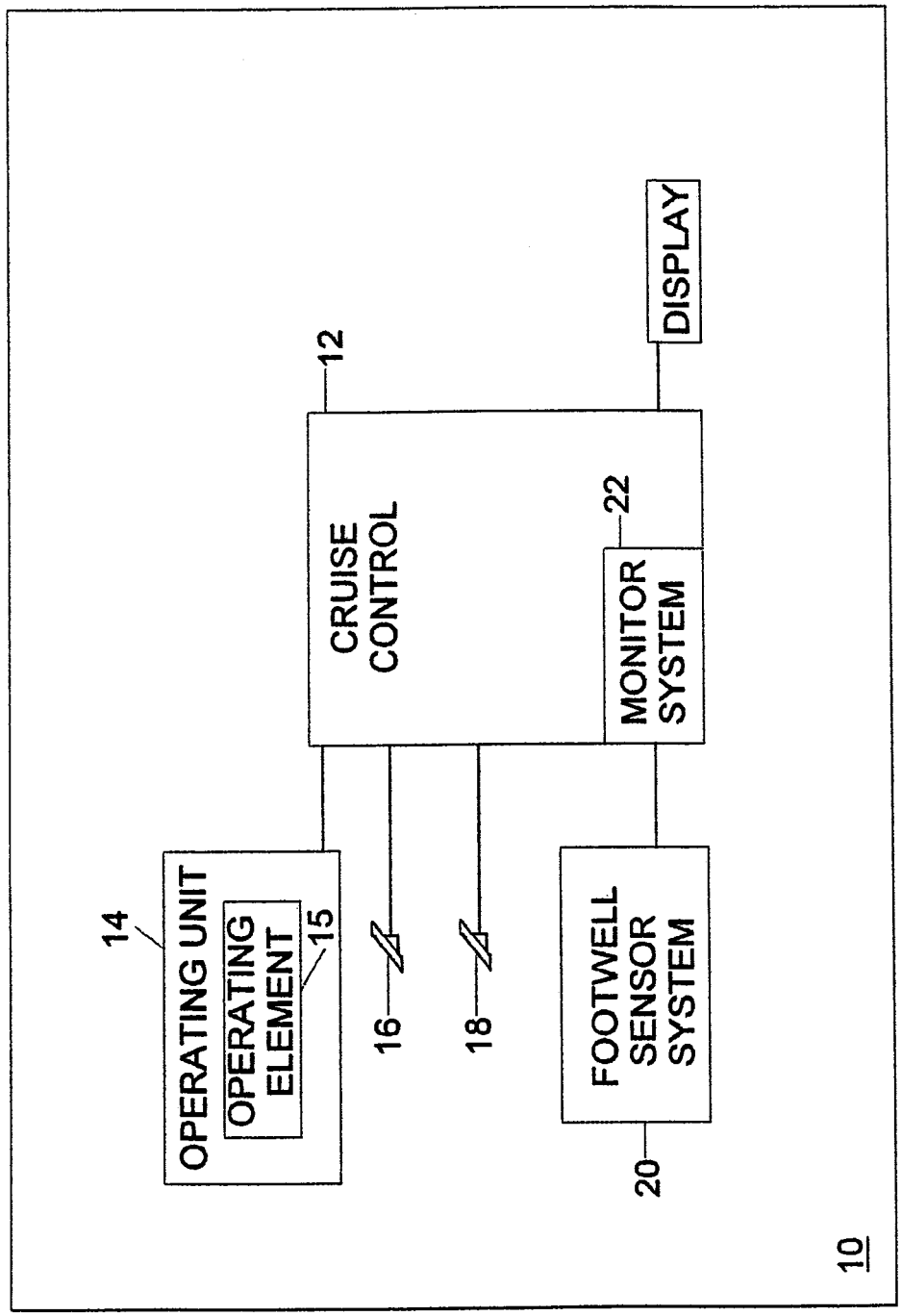

CRUISE CONTROL SYSTEM FOR MOTOR VEHICLES

CROSS-REFERENCE TO RELATED APPLICATIONS

This application is a continuation of PCT International Application No. PCT/EP2008/004973, filed Jun. 20, 2008, which claims priority under 35 U.S.C. §119 to German Patent Application No. DE 10 2007 031 541.6, filed Jul. 6, 2007, the entire disclosures of which are herein expressly incorporated by reference.

BACKGROUND AND SUMMARY OF THE INVENTION

The invention relates to a cruise control system for motor vehicles for controlling the speed to a preset desired speed.

Cruise control systems permit driving at a desirable speed adjustable by the driver without requiring the driver to continuously define the speed by way of the accelerator pedal. These cruise control systems are suitable mainly for driving on expressways having a low traffic density because constant-speed driving is often desirable there.

Motor vehicles with cruise control systems have been known for a long time. Most currently available cruise control systems control the speed of the motor vehicle to a preset desired speed. In addition to these speed control systems, cruise control systems having a range control system are also obtainable from a few manufacturers. With respect to the principle, the generally known cruise control system, which maintains a certain preset desired speed, is expanded in this case by an additional ranging function, so that the use of such a "range-related" cruise control also becomes possible in dense expressway and road traffic. This so-called "range-related" cruise control system maintains the preset desired speed when its own traffic lane is free. When a range sensor system mounted on the motor vehicle, which, in particular, may operate on a radar basis, recognizes in its own traffic lane a target object or (motor) vehicle driving ahead if it, its own speed will be adapted to the speed of the motor vehicle driving ahead, for example, by causing a suitable braking torque. In some cases, such systems are capable of controlling a following vehicle to a stop.

In principle, cruise control systems can be switched on and off by use of a first operating unit mounted on the steering wheel or dashboard or by use of a lever arranged in the proximity of the steering wheel. As a rule, the desired speed is also preset by way of a corresponding second operating unit, in which case, by means of the actuation, either the current speed is set as the desired speed by actuating a so-called set key, or an already stored (old) desired speed is set as a new desired speed by actuating a so-called resume key. In this case, a separate operating element for each function or adjustment is provided within the operating units.

Furthermore, the speed control of cruise control systems further developed in such a manner can be interrupted as a result of certain driving or driver's maneuvers, so that the cruise control system is basically still switched on but the speed control is currently not implemented. An interruption of the speed control takes place, for example, when the driver actuates the brake pedal or the hand brake, or because of an automatic directional control intervention. Cruise control systems further developed in this manner are often difficult to operate for persons who do not regularly use the cruise control system because, as a result of the numerous operating elements, the selection of functions appears to be confusing.

As an alternative to currently available cruise control systems, DE 2829894 A1 also discloses a system for automatically controlling the speed of the motor vehicle to a preset desired speed, wherein the desired speed is not preset by a separate operating element, but rather by actuating the accelerator pedal or the brake pedal. In this case, when the driving speed desired by him has been reached, the person steering the vehicle can continue to drive at the current speed by removing his foot from the just actuated pedal (accelerator pedal or brake pedal). An interruption of the cruise control does not seem to be possible.

It is an object of the invention to provide a cruise control system that can be operated by the driver in a simple and intuitive manner.

This object is achieved by a cruise control system for a motor vehicle for controlling the vehicle speed to a preset desired speed. An operating unit is provided for switching the cruise control on and off. An accelerator pedal is provided for activating the cruise control and for presetting the desired speed. A brake pedal interrupts the active cruise control. Advantageous further developments are described herein.

In a simplest embodiment, the cruise control system according to the invention includes only the following three operating elements by whose actuation all adjustments for controlling the speed can be carried out: (a) an operating unit for switching the cruise control on and off, (b) an accelerator pedal, which is present anyhow, for activating the cruise control and for presetting the desired speed, and (c) a brake pedal, which is present anyhow, for interrupting the active cruise control.

This cruise control system therefore has the advantages of the known cruise control systems without their disadvantages, specifically the disadvantages of having a complicated operation. As a result of this invention, the driver can carry out an extremely simple and intuitive operation of the essential adjustments for controlling the speed.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE is a simplified block diagram illustrating an exemplary cruise control system according to the invention.

DETAILED DESCRIPTION OF THE DRAWING

Referring to the FIGURE, a vehicle 10 includes a cruise control system 12. In the simplest embodiment, an operating unit 14 for switching the cruise control system 12 on and off carries out only two functions. When the cruise control system 12 is in a switched-off state, it will be switched on by actuating a (first) operating element 15. When the cruise control system is in a switched-on state, it will be switched off by actuating a (second) operating element 15. Advantageously, the (first) operating element is further developed as an operating element for switching on the cruise control system and the (second) operating element is further developed as an operating element for switching off the cruise control system, the switching-on and off taking place as a function of the actual state of the cruise control. Additional functions of one operating element will be explained below.

On the one hand, an accelerator pedal 16 is used for activating an interrupted, i.e. switched-on but currently not active, cruise control, and, on the other hand, the accelerator pedal 16 is used for adjusting or presetting the desired speed.

If the cruise control is interrupted at the time, activation can be caused by actuating the accelerator pedal. Since, at the point in time of the actuation of the accelerator pedal, the driver himself is still determining the speed of the motor vehicle in the conventional manner, the cruise control can advantageously only be activated, thus, resumed, as soon as the driver releases the actuated accelerator pedal again. As an alternative, the cruise control can also be activated immediately as soon at the accelerator pedal is actuated, the controlling then virtually being ineffective during the actuation because the actual speed simultaneously is the desired speed. As a result, no additional operating element is required for activating the interrupted cruise control.

In addition to activating an interrupted cruise control, the accelerator pedal also takes over the function of presetting the desired speed. This also takes place by a corresponding actuation of the accelerator pedal.

During the actuation and subsequent releasing of the accelerator pedal, the actual speed during the releasing of the accelerator pedal (or a speed determined as a function of the actual speed during the releasing of the accelerator pedal) is advantageously preset as the desired speed. In the case of the desired speed as a function of the actual speed, at least one additional vehicle parameter, which contains a measurement for the actual driving condition of the vehicle, is advantageously taken into account for the determination. Accordingly, not only the actual speed of the vehicle but also the actual driving condition is taken into account. As a result, the driver's subjective impression when controlling the speed to the desired speed can be improved.

Advantageously, an actual speed occurring after a preset first driving-condition-dependent time interval after the release of the accelerator pedal or a maximal speed within this time interval can be preset as the desired speed. As a result, it can be ensured that, for example, the already emitted energy of the drive unit can be still further utilized. The first driving-condition-dependent time interval can, for example, be preset as a function of the actual engine drag moment.

As an alternative or in addition, when presetting the desired speed, the acceleration, particularly the longitudinal acceleration of the motor vehicle, present when releasing the accelerator pedal can also be taken into account. In this case, the actual acceleration can be taken into account such that the desired speed is preset from the actual speed and the acceleration with a defined foreseeable time period; i.e., after the release of the accelerator pedal, the sum of the actual speed and the product of the actual acceleration with a preset second time interval will be preset as the desired speed.

In contrast to the actuation of the accelerator pedal, no desired speed is preset with the actuation of a brake pedal 18. On the contrary, when the brake pedal 18 is actuated or when a braking intention is recognized, the active cruise control is interrupted so that, when the brake pedal is released, the actual speed is not maintained but is delayed on the basis of the actual engine drag moment. A braking intention can be recognized, for example, as a function of the signals of a sensor system 20 for monitoring the footwell. In this case, it is significant that, by means of the appropriate sensor system 20 for monitoring the footwell, the driver's readiness to brake or intention to brake can be recognized even before the actual actuation of the braking pedal, and the cruise control can therefore be interrupted significantly faster, such as before the actual actuating of the brake pedal.

The emitted signals of the sensor system for monitoring the footwell can be detected by a monitoring unit 22 and can be analyzed with respect to recognizing a readiness to brake. In this case, the monitoring unit 22 can advantageously determine the probability of a readiness to brake from the signals of the footwell monitoring sensor system. As a function of the determined probability, the monitoring unit 22 can carry out an interruption of the cruise control system 12. When the determined probability exceeds a preset probability threshold, an interruption of the cruise control can be initiated.

Instead of a probability determination, the monitoring unit may also immediately carry out an interruption of the cruise control in the event of the presence of certain signals or a certain signal combination without any probability determination.

Since, in the case of a cruise control system further developed in this manner, the cruise control would be activated every time the driver actuates the accelerator pedal or releases the actuated accelerator pedal, at least one additional operating element has to be provided by whose actuation the driver can decide whether he wants to switch on the cruise control system or currently wants to drive without any aid. As mentioned above, the cruise control system therefore includes an operating unit—advantageously having a single operating element 15—which, in a simplest embodiment, permits only a switching-on and switching-off of the cruise control system.

Advantageously, the one operating element for switching the cruise control on and off is therefore further developed such that, when the operating element is actuated while the cruise control is switched off, the cruise control is switched on, and is switched off when the operating element is actuated while the cruise control is switched on and active or switched on and interrupted. Only a single operating element is therefore available to the driver by means of whose actuation he can switch the cruise control either on or off. When the cruise control system is switched on by actuating the single operating element, the cruise control system can either immediately switch to an active mode—in which case the actual speed is preset as the desired speed—, or can switch to an interrupted control mode, in which currently no cruise control is carried out. The cruise control will not be activated before the accelerator pedal is actuated and the accelerator pedal is possibly released subsequently.

In order to inform the driver as to whether the cruise control system is switched on at the time, an optical display should be activated either in the proximity of the operating element or in the instrument panel. Analogously, the optical display can also be activated only when the cruise control system is switched off.

In an alternative embodiment, the operating unit with the operating element for switching the cruise control on and off may also be further developed such that, by actuating the operating element in the switched-off condition, the cruise control system is switched on. In this case, the cruise control can immediately become active or remain interrupted. When the operating element is actuated while the cruise control is switched on and active, the cruise control is only interrupted. When the operating element is actuated while the cruise control is switched on and interrupted, then the interrupted cruise control is switched off.

In order to be able to immediately switch off the cruise control system by actuating the operating element only once when the cruise control is in a switched on and active state, the one operating element can be further developed such that, while the cruise control is switched on and possibly while the cruise control is active, the control system can be switched off immediately when the operating element is actuated for a preset time period. As an alternative, the operating element can also be actuated with a preset force, which has the result that the operating element is moved into a second position, reachable only at an increased expenditure of force. When this second position has been reached, the cruise control system will be switched off independently of the actual condition or state. This further development of the cruise control system permits an extremely simple and intuitive operation of the cruise control system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cruise control system for a motor vehicle in which the system controls a vehicle speed to a preset desired speed, the cruise control system comprising:
    an operating unit operatively configured for switching the cruise control system on and off;
    an accelerator pedal of the vehicle operatively configured to activate a cruise control of the cruise control system and to preset the desired speed of the vehicle, wherein the cruise control is activated upon one of a release of the accelerator pedal, or an initial actuation of the accelerator pedal such that the initial actuation of the accelerator pedal causes both the vehicle to accelerate and the cruise control to be activated; and
    a brake pedal of the vehicle operatively configured to interrupt the cruise control when active.

2. The cruise control system according to claim 1, wherein the accelerator pedal is operatively configured to actuate the cruise control either upon actuation of the accelerator pedal or upon releasing actuation of the accelerator pedal.

3. The cruise control system according to claim 2, wherein when the accelerator pedal is actuated, one of an actual speed at a time of actuation, an actual speed at a time of releasing the accelerator pedal, and a speed determined as a function of the actual speed when releasing the accelerator pedal, is preset as the desired speed of the vehicle.

4. The cruise control system according to claim 1, wherein active cruise control is interrupted when the brake pedal is actuated or upon recognizing a braking intention on the part of a driver.

5. The cruise control system according to claim 4, further comprising a footwell sensor system operatively configured to monitor the footwell of the vehicle in order to recognize the braking intention on the part of the driver.

6. The cruise control system according to claim 1, wherein the operating unit comprises an operating element for switching the cruise control on and off, said operating element being operatively configured such that, upon being actuated while the cruise control system is switched off, the cruise control system is switched on.

7. The cruise control system according to claim 6, wherein the operating element is further operatively configured such that, upon actuating the operating element while the cruise control system is switched on and in an active state, the cruise control is one of interrupted and switched off.

8. The cruise control system according to claim 7, wherein said operating element is further operatively configured such that, upon actuating the operating element while the cruise control system is switched on and in an interrupted state, the cruise control system is switched off.

9. The cruise control system according to claim 1, wherein the operating unit further comprises an operating element for switching the cruise control on and off, said operating element being operatively configured such that, upon actuating the operating element while the cruise control system is switched on and in an active state, the cruise control is one of interrupted and switched off.

10. The cruise control system according to claim 9, wherein said operating element is further operatively configured to only switch-off the cruise control system when actuated for a preset time or with a present force.

11. The cruise control system according to claim 1, wherein the operating unit comprises an operating element for switching the cruise control system on and off, said operating element being operatively configured such that, upon actuating the operating element while the cruise control system is switched on and in an interrupted state, the cruise control system is switched off.

12. The cruise control system according to claim 11, wherein said operating element is further operatively configured to only switch-off the cruise control system when actuated for a preset time or with a present force.

13. The system according to claim 1, wherein an actual acceleration of the motor vehicle is used, at least in part, to preset the desired speed of the vehicle.

14. A method of operating a cruise control system for a motor vehicle for controlling a vehicle speed to a preset target speed, in which an operating unit switches the cruise control system on and off, the method comprising the acts of:
    when the cruise control system is switched on, activating a cruise control and presetting the target speed using an accelerator pedal of the vehicle,. wherein the cruise control is activated upon one of a release of the accelerator pedal, or an initial actuation of the accelerator pedal such that the initial actuation of the accelerator pedal causes both the vehicle to accelerate and the cruise control to be activated;
    interrupting an active cruise control using the brake pedal of the motor vehicle;
    wherein the operating unit is the only operational control of the cruise control system, during activation of which the cruise control is switched on or off in accordance with a current operating state of the cruise control system.

15. The method according to claim 14, further comprising the act of activating the cruise control as soon as the accelerator pedal is actuated or as soon as the actuated accelerator pedal is released.

16. The method according to claim 15, further comprising the act of:
    presetting the target speed as either an actual speed at the time the accelerator pedal is actuated, an actual speed at the time the accelerator pedal is released, or a speed determined as a function of the actual speed at the time of the accelerator pedal is released.

17. The method according to claim 16, further comprising the act of interrupting the active cruise control when either the brake pedal is actuated or a braking intention is determined.

18. The method according to claim 14, wherein upon actuating the operating unit while the cruise control system is switched on and in an active state, the cruise control is one of interrupted and switched-off.

19. The method according to claim 18, wherein upon actuating the operating unit while the cruise control system is switched on and in an interrupted state, the cruise control system is switched off.

20. The method according to claim 14, wherein an actual acceleration of the motor vehicle is used, at least in part, to preset the desired speed of the vehicle.

* * * * *